INVENTORS
Wilhelmus G. Vermeulen
Leendert Verhoef
BY Stevens Davis, Miller & Mosher
ATTORNEYS United States Patent Office 3,433,043
Patented Mar. 18, 1969

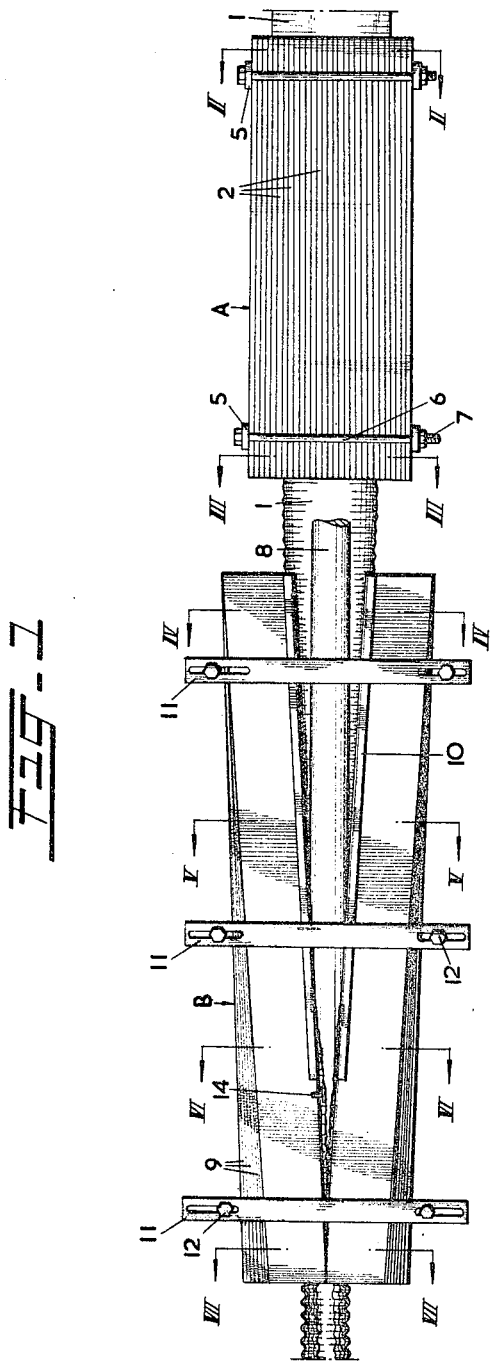

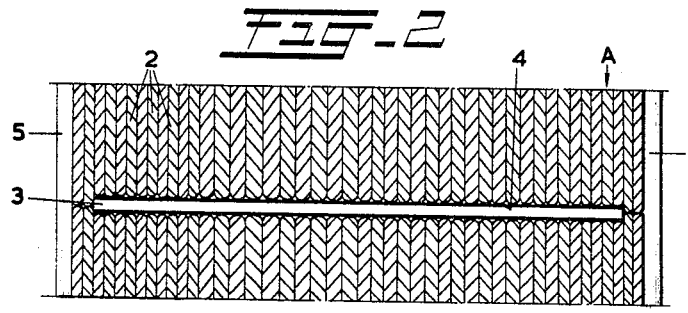
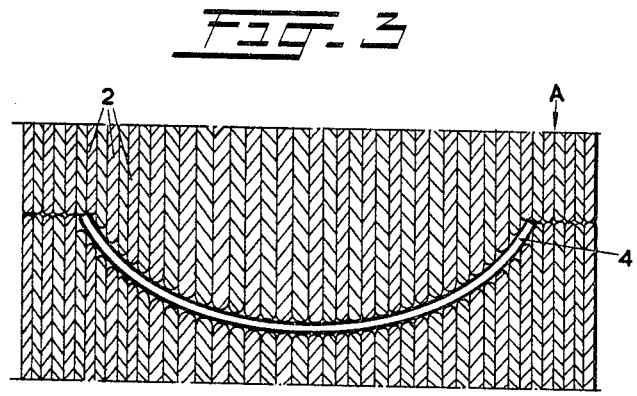
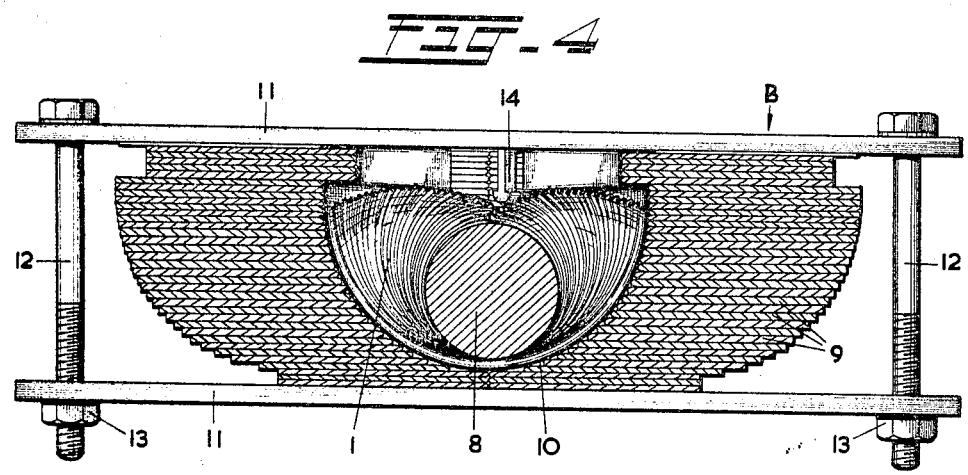

3,433,043
APPARATUS FOR MANUFACTURING A TUBULAR ELEMENT FROM A LONG METAL STRIP
Wilhelmus Georgius Vermeulen, The Hague, and Leendert Verhoef, Schipluiden, Netherlands, assignors to N.V. Nederlandsche Kabelfabrieken, Delft, Netherlands, a corporation
Filed Nov. 22, 1965, Ser. No. 508,970
Claims priority, application Netherlands, Dec. 2, 1964, 6413984
U.S. Cl. 72—176  5 Claims
Int. Cl. B21d 5/10; B21c 37/06, 3/06

ABSTRACT OF THE DISCLOSURE

A die for forming a tubular element from a flat metal strip and having a shaping body which is composed of a large number of lamellae superimposed one upon the other with their inner edges defining a forming channel for the metal strip, the dimensions of said channel being adjustable by virtue of said lamellae being slidably shiftable relative to one another whereby the die may be adjusted to produce tubes of various desired dimensions.

---

Figure 5:
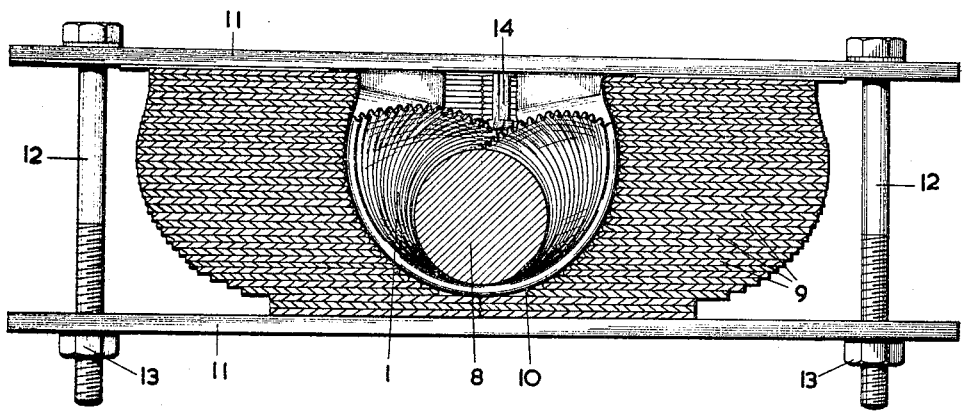

The invention relates to an apparatus for manufacturing a tubular element from a long metal strip, which apparatus comprises at least one die with an internal channel, in which the strip during its travel in the longitudinal direction is bent in the transverse direction.

An apparatus of this kind is known. The die, through which in this known apparatus the strip is drawn by means of a flexible motor-driven belt, is suitable only for a particular diameter of the tubular element to be formed.

It is the object of the invention to avoid this drawback, only one die being required for widely divergent diameters of the elements.

To this end the apparatus according to the invention is characterized in that each die is composed of a number of members which have been arranged to be adjustable in such a way that the form of the channel can be adapted to the diameter of the tubular element.

The adjustable members according to the invention may have various forms, such as telescoping rings, but they are preferably formed by a large number of lamellae resting with their sides against each other.

It has been found that the best bending results are obtained when the strip is guided on both sides in the initial stage of the bending process. In order to ensure that the outer surface of the strip over the length of the die is pressed completely against the interior of the die, a preferred embodiment of the invention consists of two parts, the lamellae in the first part taking up a vertical position and forming a narrow slit, through which the strip is guided on both sides, while in the second part the lamellae are arranged horizontally and form a shaping funnel, in which the strip is guided only on its outer surface.

For special purposes it is necessary for the strip to be provided with transverse corrugations. If no special measures have been taken, these transverse corrugations are in danger of being damaged during the travel of the strip through the die. In the known apparatus this problem has been solved by means of a belt travelling along with the strip. In the preferred embodiment according to the invention this construction is not at once possible, since in the first part a travelling belt would then have to be used on the upper as well as the lower side of the strip.

According to the invention this problem is solved in a simple way by the feature that the channels formed by the lamellae in both parts are coated all round with a fixed foil of wear-resistant synthetic material. It is a further advantage of this foil that the position of the lamellae is not very critical and that fairly coarse lamellae can be used, in spite of the numerous stepped transitions thus formed in the wall of the shaping funnel.

The invention further relates to a process for covering a cable with a metal strip provided with transverse corrugations by means of the apparatus described, the strip and the cable being drawn jointly through a die, in which die the strip is bent about the cable during its longitudinal travel. According to the invention the cable is fed into the above-mentioned funnel part of the die.

Finally the invention concerns a cable which has been covered according to this process with a metal strip provided with transverse corrugations.

The invention will now be elucidated more fully by reference to the figures, which illustrate an embodiment of the invention.

FIG. 1 shows a top view of the apparatus according to the invention.

Figure 6:
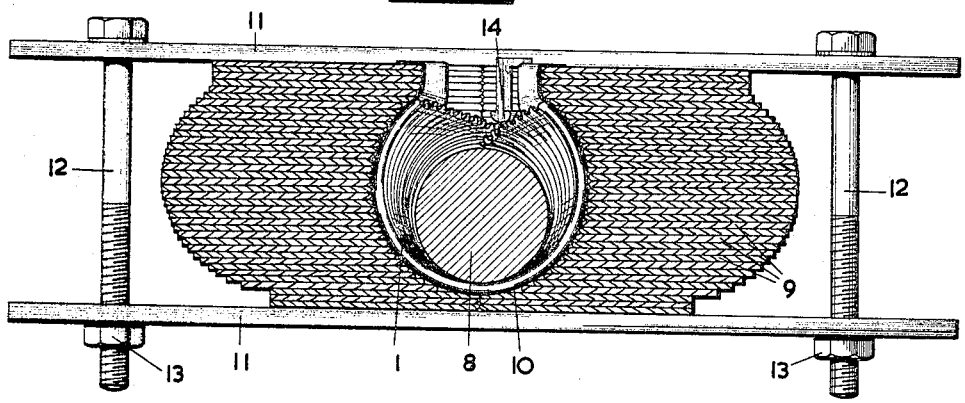
Figure 7:
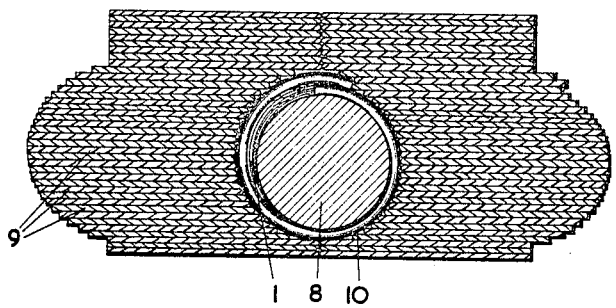

FIGS. 2 to 7 inclusive show cross-sections along the lines II—II to VII—VII inclusive in FIG. 1.

A flat metal strip 1 provided with transverse corrugations and consisting, for instance, of aluminium is fed into the part A of the apparatus according to the invention, consisting of two parts A and B.

The part A is composed of vertical lamellae 2 resting with their sides against each other and enclosing a narrow slit 3. At the feeding end of the part A this slit has a rectilinear cross-section (FIG. 2) and it gradually passes into the partly circular cross-section of FIG. 3. During its travel through this slit the metal strip is guided on both sides, while between the strip and the lamellae a foil of smooth wear-resistant synthetic material 4, e.g. of hard polyvinyl chloride, has been provided. The lamellae 2 are pressed against each other by means of upstanding members 5, which are connected in pairs by rods 6 and nuts 7. When it has left the part A, the bent strip is fed into the shaping funnel part B, along with the cable 8. This part B is composed of horizontal lamellae 9, while the funnel-shaped channel formed by these lamellae is coated with a foil of wear-resistant synthetic material 10. The lamellae 9 are pressed against each other by means of members 11, which are connected in pairs by rods 12 and nuts 13. As appears from FIGS. 4 to 7 inclusive, as it travels through the channel the strip 1 is gradually bent about the cable 8. In order to make the longitudinal edges of the strip 1 overlap, near the end of the shaping funnel B is arranged a pressure member 14, which impresses one longitudinal edge of the strip. The same effect can also be obtained by adjusting the funnel somewhat asymmetrically. At the discharge end of the funnel B the cable is covered by the strip.

The overlapping longitudinal edges of the strip can be joined together in a manner known per se, e.g. by welding.

The channels of the parts A and B can readily be adapted to the diameter of the tubular element to be formed, viz. by means of mandrels, which are fitted in the channels of the parts A and B and against which the lamellae are pressed.

When the lamellae have been adjusted in the correct position, they are pressed together by members 5 and 11.

The foils 4 and 10 arranged in the shaping channels and consisting of wear-resistant synthetic material serve in the first place to prevent damage to the transverse corrugations in the metal strip by the edges of the lamellae. Furthermore the adjustment of the lamellae is not very critical when a foil is used, while fairly coarse lamellae can be employed. The noncritical adjustment of the lamellae is of importance in connection with the fact that owing to the clamping of the lamellae the form of the package, and thus of the internal shaping channel, is modified slightly.

Preferably in the first part A about forty and at least fifteen lamellae are arranged over the width of the metal strip, and in the second part B about twenty-five, and in any case at least fifteen, lamellae over the diameter of the tubular element.

What we claim is:

1. An apparatus for forming a tubular element from a flat metal strip, comprising a die composed of a large number of lamellae in facing contact with each other and having inner edges which define a longitudinally extending forming channel for permitting a flat metal strip to travel longitudinally therealong and thereby be shaped into a tubular element, the overlying lamellae in face to face contact being adapted to be shifted parallelly relative to one another, releasable securing means for holding said lamellae immovable relative to each other and for, alternatively, releasing same to permit face to face shifting thereof relative to each other whereby said inner edges of the lamellae may be adjusted to provide respective different sized tubular elements.

2. The apparatus of claim 1, said die comprising two longitudinally successive parts each composed of said lamellae, the lamellae in the first of said parts which receives the metal strip spring shiftable in respective parallel planes which are perpendicular to the plane of the metal strip as it enters said die channel, the lamellae in said first of said parts defining a channel in the form of a narrow slit in which a metal strip may be received and guided on both faces thereof by opposed inner edges of said lamellae which define said slit, the lamellae in the second of said parts being arranged in planes perpendicular to those of the first part and forming a channel generally in the shape of a funnel in which the metal strip may be guided only on its outer face by the inner edges of the lamellae defining said funnel.

3. The apparatus of claim 2, the inner edges of said lamellae which define said channel being covered with a fixed foil of wear-resistant synthetic material having a smooth surface.

4. The apparatus of claim 2, said first and seconds parts of said die each comprising at least fifteen of said lamellae.

5. A process for covering a cable with a tubular element which starts as a flat metal piece, comprising:

passing a flat metal piece through a longitudinally extending channel in a die whereby said piece is progressively bent into tubular form in two stages,
(a) in the first of said stages said piece being bent from a flat form into a relatively wide arcuate shape while being guided on both faces thereof, and
(b) in the second of said stages, said piece being bent from said wide arcuate shape into the final desired tubular shape while being guided on only the outer face thereof, and
(c) feeding a cable into the inlet end of the channel in said second stage on the inner side of said metal piece and advancing both said cable and said piece simultaneously through said second stage.

References Cited

UNITED STATES PATENTS

| 1,252,821 | 1/1918 | Lewis | 18—12 |
| 2,935,110 | 5/1960 | Roxy | 72—176 |
| 3,026,924 | 3/1962 | Lunt | 72—51 |

FOREIGN PATENTS 906,702  9/1962  Great Britain.

MILTON S. MEHR, *Primary Examiner.*

U.S. Cl. X.R.

72—51, 368, 467